(12) United States Patent
Tian et al.

(10) Patent No.: US 11,287,732 B2
(45) Date of Patent: Mar. 29, 2022

(54) OPTICAL ILLUMINATION SYSTEM AND PROJECTION DEVICE

(71) Applicant: Hisense Laser Display Co., Ltd., Shandong (CN)

(72) Inventors: Yong Tian, Shandong (CN); Lu Chen, Shandong (CN); Liang Yin, Shandong (CN); Xiuyan Cao, Shandong (CN)

(73) Assignee: Hisense Laser Display Co., Ltd., Qingdao (CN)

( * ) Notice: Subject to any disclaimer, the term of this patent is extended or adjusted under 35 U.S.C. 154(b) by 0 days.

(21) Appl. No.: 16/803,256

(22) Filed: Feb. 27, 2020

(65) Prior Publication Data
US 2020/0209728 A1 Jul. 2, 2020

Related U.S. Application Data

(63) Continuation of application No. PCT/CN2019/128858, filed on Dec. 26, 2019.

(30) Foreign Application Priority Data

| Dec. 28, 2018 | (CN) | 201811620093.2 |
| Dec. 28, 2018 | (CN) | 201811620095.1 |
| Jan. 23, 2019 | (CN) | 201910063920.0 |

(51) Int. Cl.
  *G03B 21/14* (2006.01)
  *G03B 21/20* (2006.01)
  *G02B 17/08* (2006.01)

(52) U.S. Cl.
  CPC ..... *G03B 21/2066* (2013.01); *G02B 17/0856* (2013.01); *G03B 21/2033* (2013.01)

(58) Field of Classification Search
  CPC .. G03B 21/003; G03B 21/005; G03B 21/006; G03B 21/008
  (Continued)

(56) References Cited

U.S. PATENT DOCUMENTS

2003/0123162 A1* 7/2003 Penn ................. G02B 5/04
                                                     359/833
2005/0036118 A1   2/2005 Naofumi et al.
(Continued)

FOREIGN PATENT DOCUMENTS

| CN | 1580940 A | 2/2005 |
| CN | 1580940 A | 2/2005 |

(Continued)

OTHER PUBLICATIONS

ISA State Intellectual Property Office of the People's Republic of China, International Search Report Issued in Application No. PCT/CN2019/128858, dated Mar. 26, 2020, WIPO, 5 pages.
(Continued)

*Primary Examiner* — William C. Dowling
(74) *Attorney, Agent, or Firm* — Crowell & Moring LLP (57) ABSTRACT

Provided are an optical illumination system, and a projection device. In an example, the optical illumination system includes a DMD, a lens assembly and a RTIR assembly. The lens assembly adjusts a light beam. The RIM assembly includes a first plano-convex lens and a wedge prism. The first plano-convex lens includes a plane surface and a convex surface and is configured to refract the light beam adjusted by the lens assembly. The wedge prim includes a first side surface, a second side surface and a third side surface. The plane surface of the first plano-convex lens is glued with the first side surface of the wedge prism. The wedge prism is configured to receive and refract the light beam refracted by the first plano-convex lens through the first side surface, and the light beam refracted by the first side surface is transmitted through the second side surface. The DMD is at a light emitting side of the second side surface of the wedge prism, and configured to receive and reflect the light beam from the second side surface of the wedge prism. The reflected light beam is incident to the first
(Continued)

side surface of the wedge prism through the second side surface of the wedge prism for total internal reflection then transmitted through the third side surface.

14 Claims, 8 Drawing Sheets

(58) Field of Classification Search
    USPC ............................................................ 353/81
    See application file for complete search history.

(56) References Cited

U.S. PATENT DOCUMENTS

| | | | |
|---|---|---|---|
| 2007/0019165 A1 | 1/2007 | Naofumi | |
| 2007/0109507 A1* | 5/2007 | Ishikura | G02B 26/0833 353/84 |
| 2009/0190101 A1 | 7/2009 | Ilkka et al. | |
| 2011/0181839 A1 | 7/2011 | Naoki et al. | |
| 2013/0188156 A1* | 7/2013 | Kim | G03B 21/28 353/81 |
| 2015/0131058 A1 | 5/2015 | Huang | |

FOREIGN PATENT DOCUMENTS

| | | |
|---|---|---|
| CN | 102132208 A | 7/2011 |
| CN | 102135720 A | 7/2011 |
| CN | 203838464 U | 9/2014 |
| CN | 104142605 A | 11/2014 |
| CN | 105793744 A | 7/2016 |
| CN | 106324968 A | 1/2017 |
| CN | 108459456 A | 8/2018 |
| CN | 108490720 A | 9/2018 |
| CN | 108628074 A | 10/2018 |
| CN | 108803219 A | 11/2018 |
| CN | 208384331 U | 1/2019 |
| JP | 2017032964 A | 2/2017 |

OTHER PUBLICATIONS

First Office Action and Search Report dated May 19, 2021 for Chinese Patent Application No. 201811620093.2.
First Office Action and Search Report dated Jun. 15, 2021 for Chinese Patent Application No. 201811620095.1.

* cited by examiner

FIG. 13 at least three laser assemblies are controlled to enable the at least three laser assemblies to output at least three groups of light beams of different colors which pass through a lens assembly, a first plano-convex lens, a wedge prism, a DMD and the wedge prism for projection sequentially — 1401

FIG. 14

OPTICAL ILLUMINATION SYSTEM AND PROJECTION DEVICE

CROSS REFERENCE TO RELATED APPLICATIONS

This application is a continuation application of International Application No. PCT/CN2019/128858 filed on Dec. 26, 2019, which claims priority to Chinese Patent Application No. 201811620093.2 filed on Dec. 28, 2018, Chinese Patent Application No. 201811620095.1 filed on Dec. 28, 2018, and Chinese Patent Application No, 201910063920.0 filed on Jan. 23, 2019, the entire contents of which are incorporated herein by reference.

TECHNICAL FIELD

The present disclosure relates to laser projection technology and in particular to an optical illumination system and a projection device.

BACKGROUND

Due to high brightness, strong directivity, good coherence and so on, laser light is used in projection technology as a light source for providing the illumination required in a projection device.

In continuous improvement of projection devices, a size occupied by an optical illumination system affects a space occupied by the projection device to some extent.

SUMMARY

According to a first aspect of the present disclosure, there is provided an optical illumination system. This optical illumination system includes a lens assembly, and a refraction total internal reflection (RTIR) assembly and a digital micro-mirror device (DMD). The lens assembly is configured to adjust a light beam. The RTIR assembly includes a first plano-convex lens and a wedge prism. The first plano-convex lens is configured to refract the light beam adjusted by the lens assembly. The wedge prism includes a first side surface, a second side surface and a third side surface. The first side surface of the wedge prism is glued with a plane surface of the first plano-convex lens, and the wedge prism is configured to receive and refract the light beam refracted by the first plano-convex lens through the first side surface. The light beam refracted by the first side surface is transmitted through the second side surface. The DMD is at a light emitting side of the second side surface of the wedge prism and configured to receive and reflect the light beam transmitted through the second side surface of the wedge prism. The reflected light beam passes through the second side surface of the wedge prism and is incident to the first side surface of the wedge prism for total internal reflection then transmitted through the third side surface.

According to a second aspect of the present disclosure, there is provided a projection device. The projection device includes a light source system and an optical illumination system. The light source system is configured to emit a light beam. The optical illumination system includes a lens assembly, a RTIR assembly and a DMD. The lens assembly is at a light emitting side of the light source system and configured to adjust the light beam emitted by the light source system. The RTIR assembly includes a first plano-convex lens and a wedge prism. The first plano-convex lens includes a plane surface and a convex surface. The wedge prism includes a first side surface, a second side surface and a third side surface. The first side surface of the wedge prism is glued with the plane surface of the first plano-convex lens. The first plano-convex lens and the wedge prism sequentially refract the light beam adjusted by the lens assembly. The refracted light beam is transmitted through the second side surface of the wedge prism. The MID is at a light emitting side of the second side surface of the wedge prism and configured to receive and reflect the light beam from the second side surface of the wedge prism. The reflected light beam passes through the second side surface of the wedge prism and is incident to the first side surface of the wedge prism for total internal reflection then transmitted through the third side surface.

According to a third aspect of the present disclosure, there is provided a projection device. The projection device includes a light source system and the optical illumination system according to the first aspect. The light source system includes at least three laser assemblies. The at least three laser assemblies are configured to output at least three groups of light beams of different colors. The lens assembly of the optical illumination system is at a light emitting side of the at least three laser assemblies. The lens assembly is configured to adjust the light beams emitted by the at least three laser assemblies and emit the adjusted light beams to the first plano-convex lens.

BRIEF DESCRIPTION OF THE DRAWINGS

To describe the technical solutions in an example of the present disclosure more clearly, drawings required in descriptions of the examples of the present disclosure are briefly introduced below. The drawings described below are merely examples of the present disclosure and other drawings may be obtained by those of ordinary skill in the prior art based on these drawings in the examples of the present disclosure.

NUMERALS OF DRAWING

1: light source system, 2: optical illumination system, 3: imaging system,
11: laser assembly, 12: laser light focusing assembly, 13: conic reflecting body, 14: light beam shaping assembly;
121: convex reflector, 122: concave reflector, 123: first double-convex lens, 124: first double-concave lens, 125: second double-convex lens, 126: second plano-convex lens;
141: first concave-convex lens, 142: third double-convex lens, 143: second concave-convex lens;
21: DMD, 22: lens assembly, 23: RTIR assembly, 24: plane reflector, 25: rectangular light pipe, 26: flat plate vibrating element, 27: TIR assembly;
221: third concave-convex lens, 222: fourth double-convex lens, 223: fly-eye lens, 224: fifth double-convex lens, 231: first plano-convex lens, 232: wedge prism, 2321: first wedge prism, 2322: second wedge prism.

DETAILED DESCRIPTION OF THE EMBODIMENTS

To make the object, technical solutions and advantages of the present disclosure clearer, the examples of the present disclosure is provided in detail below in combination with the accompanying drawings.

Figure 1:
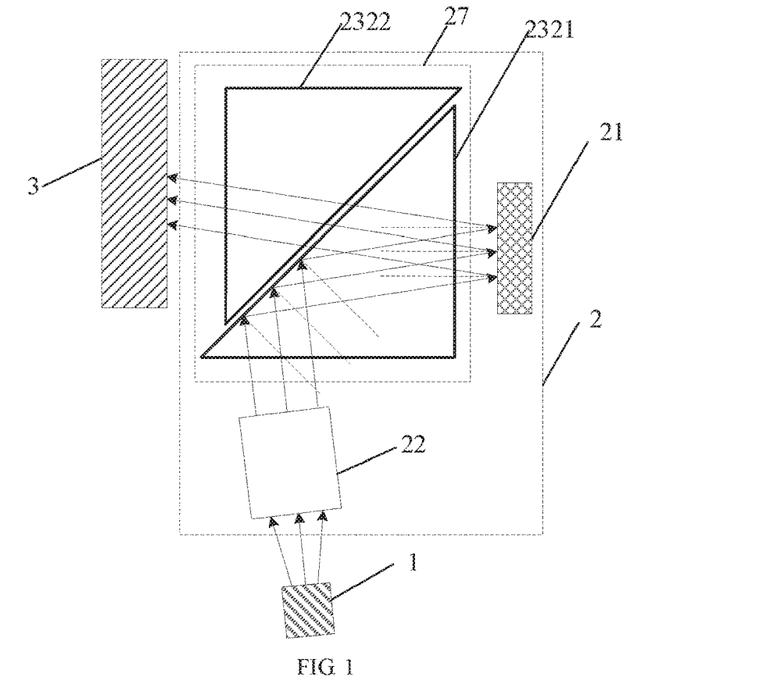
FIG. 1 is a schematic diagram illustrating a structure of a projection device according to some examples of the present disclosure.

In some examples of the present disclosure, as shown in FIG. 1, a projection device may include a light source system 1, an optical illumination system 2 and an imaging system 3. The optical illumination system 2 mainly includes a lens assembly 22, a Total Internal Reflection (TIR) assembly 27, and a Digital Micro-mirror Device (DMD) 21. A centreline of the lens assembly 22 overlaps with a primary optical axis of a light beam emitted by the light source system 1. The TIR assembly is formed by gluing a first side surface of a first wedge prism 2321 of a triangular prism structure and a first side surface of a second wedge prism 2322 of a triangular prism structure. The DMD 21 is disposed in a plane that is parallel to a second side surface of the first wedge prism. The primary optical axis refers to light in a centreline direction in a light beam. A light beam emitted by the light source system 1 is processed by the lens assembly 22 to ensure a light spot (or area) formed by the processed light beam on the plane where the DMD 21 is located covers or matches the plane of the DMD 21. Afterwards, the light beam processed by the lens assembly 22 is directed to a third side surface of the first wedge prism 2321 and incident to the first side surface of the first wedge prism 2321. In this way, the processed light beam is subjected to total internal reflection at the first side surface of the first wedge prism 2321 and then reflected to the DMD 21 through the second side surface of the first wedge prism 2321. The light reflected by the DMD 21 is passed through the second side surface and the first side surface of the first wedge prism 2321, and the first side surface and the second side surface of the second wedge prism 2322 sequentially, and then is directed to the imaging system 3 of the projection device.

Figure 2:
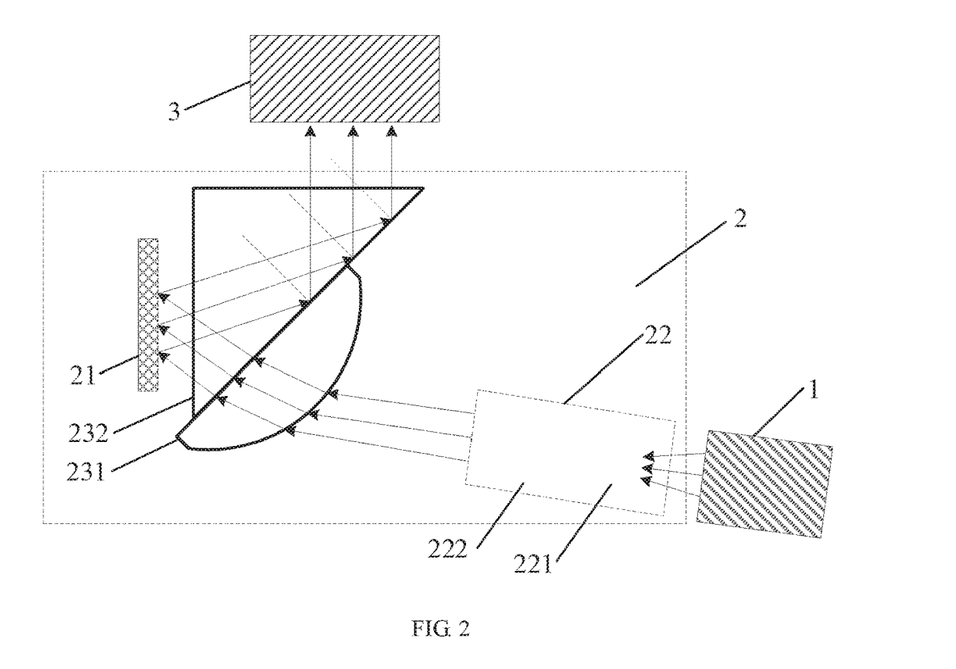
FIG. 2 is a schematic diagram illustrating a structure of a projection device according to some examples of the present disclosure.

FIG. 2 is a schematic diagram illustrating another structure of a projection device according to some examples of the present disclosure. The projection device includes a light source system 1, an optical illumination system 2 and an imaging system 3.

In some examples of the present disclosure, as shown in FIG. 2, the optical illumination system 2 includes a Digital Micromirror Device (DMD) 21, a lens assembly 22 and a Refraction Total Internal Reflection (RTIR) assembly 23. The RTIR assembly 23 includes a first plano-convex lens 231 and a wedge prism 232. A plane surface of the first plano-convex lens 231 is glued with a first side surface of the wedge prism 232. The DMD 21 is at a first light emitting side of the wedge prism 232. The first light emitting side of the wedge prism 232 refers to a side where the second side surface of the wedge prism 232 is located.

The lens assembly 22 is configured to adjust a light beam emitted by the light source system 1 and direct the adjusted light beam to a convex surface of the first plano-convex lens 231. The first plano-convex lens 231 is configured to refract the light beam adjusted by the lens assembly 22 and direct the refracted light beam to the first side surface of the wedge prism 232. The wedge prism 232 is configured to re-refract the light beam refracted by the first plano-convex lens 231 and direct the re-refracted light beam to the DMD 21 from the first light emitting side of the wedge prism 232. A light spot (or area) formed by the light beam directed to the DMD 21 on a plane where the MID 21 is located covers or matches the DMD 21. The DMD 21 is configured to reflect the light beam refracted by the wedge prism 232 and direct the reflected light beam to the first side surface of the wedge prism 232 through the second side surface of the wedge prism 232. The wedge prism 232 is further configured to perform total internal reflection for the light beam reflected by the DMD 21 and direct the light beam subjected to total internal reflection to the imaging system 3 from a second light emitting side of the wedge prism 232. The second light emitting side of the wedge prism 232 refers to a side where a third side surface of the wedge prism 232 is located.

In some examples of the present disclosure, after the light beam emitted by the light source system 1 is adjusted by the lens assembly 22, the first plano-convex lens 231 and the wedge prism 232 sequentially refract the adjusted light beam and direct the refracted light beam to the DMD 21. After being reflected by the DMD 21, the light beam is directed to the first side surface of the wedge prism 232. The first side surface of the wedge prism 232 is glued with the plane surface of the first plano-convex lens 231, that is, a gap exists between the first side surface of the wedge prism 232 and the plane surface of the first plano-convex lens 231. As a result, the light beam reflected by the DMD 21 to the first side surface of the wedge prism 232 is subjected to total internal reflection and then is directed to the imaging system 3 along the third side surface of the wedge prism 232. In this way, the number of the devices in the optical illumination system is reduced while illumination is achieved for the projection device. Further, the size of the optical illumination system is reduced, thereby realizing miniaturization of the projection device.

In some examples, a preset angle is formed between a centerline of the first plano-convex lens 231 and a centerline of the lens assembly 22. The preset angle is determined according to materials of the first plano-convex lens 231. In this way, it is ensured that an incidence angle of the light beam refracted by the first plano-convex lens 231 to the first side surface of the wedge prism 232 is smaller than a critical angle of the first plano-convex lens 231, and an incidence angle of the light beam reflected by the DMD 21 to the first side surface of the wedge prism 232 is greater than or equal to a critical angle of the wedge prism 232. Therefore, it is avoided that the light beam refracted by the first plano-convex lens 231 to the first side surface of the wedge prism 232 is subjected to total internal reflection. Further, a gap is formed between the first side surface of the wedge prism 232 and the plane surface of the first plano-convex lens 231 to ensure that the light beam reflected by the DMD 21 to the first side surface of the wedge prism 232 is subjected to total internal reflection.

The preset angle is formed by the centerline of the lens assembly 22 and the center line of the first plano-convex lens 231, that is, the preset angle is formed by a primary optical axis of the light beam emitted by the lens assembly 22 and the centerline of the first plano-convex lens 231. In this case, the light beam processed by the lens assembly 22 is incident to a half region of the first plano-convex lens 231. A thickness of the half region of the first plano-convex lens 231 changes from large to small along a direction of center-to-edge of the first plano-convex lens. The light beam refracted by the first plano-convex lens is incident to a region on the wedge prism 232, and a thickness of the wedge prism 232 changes from small to large along a direction from an edge of the wedge prism to the primary optical axis of the light beam. In this way, supplemental relationship between the lens thickness and the prism thickness is achieved, thereby realizing illumination effect of the optical illumination system 2.

The plane where the DMD 21 is located is parallel to the second side surface of the wedge prism 232. In this case, reflection effect of light beams is improved while space is saved. Further it is avoided that partial light beams are reflected to a region outside the second side surface of the wedge prism 232. Alternatively, the plane where the DMD 21 is located may further form some angle with the second side surface of the wedge prism 232, which is not limited herein as long as the light beam reflected by the DMD 21 is prevented from being incident to the region outside the second side surface of the wedge prism 232.

In some examples, when the light beam emitted by the light source system 1 is adjusted by the lens assembly 22, the centerline of the lens assembly 22 overlaps with the primary optical axis of the light beam emitted by the light source system 1, that is, a primary optical axis of a single light beam formed by processing at least three groups of light beams output by at least three laser assemblies 11 (see FIG. 9) overlaps with the centerline of the lens assembly 22. In this way, the adjustment effect of the lens assembly 22 is guaranteed and the projection effect of the projection device is improved. Alternatively, the centerline of the lens assembly 22 and the primary optical axis of the light beam emitted by the light source system 1 may form some angle, for example, an angle of 10 degrees, 15 degrees or 20 degrees or the like, which is not limited herein as long as the projection effect of the projection device is not affected.

Further, to ensure that the light beam from the optical illumination system 2 generates good projection effect in the imaging system 3, the light beam refracted by the first plano-convex lens 231 forms a first light spot in a plane where the first side surface of the wedge prism 232 is located, and the entire first light spot is within the first side surface of the wedge prism 232; the light beam refracted by the wedge prism 232 forms a second light spot in a plane where the second side surface of the wedge prism 232 is located, and the entire second light spot is within the second side surface of the wedge prism 232; the light beam reflected by the DMD 21 forms a third light spot in a plane where the first side surface of the wedge prism 232 is located, and the entire third light spot is within the first side surface of the wedge prism 232; and the light beam subject to total internal reflection of the wedge prism 232 forms a fourth light spot in a plane where the third side surface of the wedge prism 232 is located, and the entire fourth light spot is on the third side surface of the wedge prism 232.

Figure 3A:
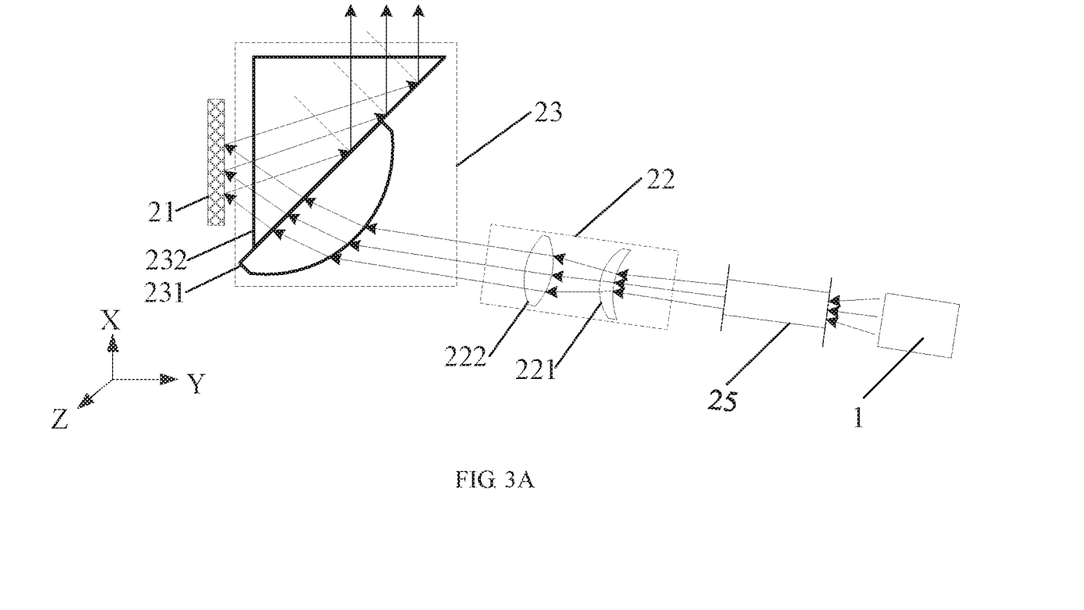
FIG. 3A is a schematic diagram illustrating a structure of an optical illumination system according to some examples of the present disclosure.

In some examples of the present disclosure, in an implementation, as shown in FIG. 3A, after the light beam emitted by the light source system 1 is adjusted by the lens assembly 22, the first plano-convex lens 231 is at a light output side of the lens assembly 22 and the convex surface of the first plano-convex lens faces the lens assembly 22. In this way, the light beam adjusted by the lens assembly 22 is directly directed to the convex surface of the first plano-convex lens 231. Thus, the first plano-convex lens 231 refracts the light beam.

For convenience of descriptions, it is assumed that Z axis is in a direction perpendicular to a paper plane of the drawings, X axis is in a direction parallel to the paper plane, and Y axis is in a direction perpendicular to X/Z axes. An angle exists between the centreline of the lens assembly 22 and the Y axis.

Figure 3B:
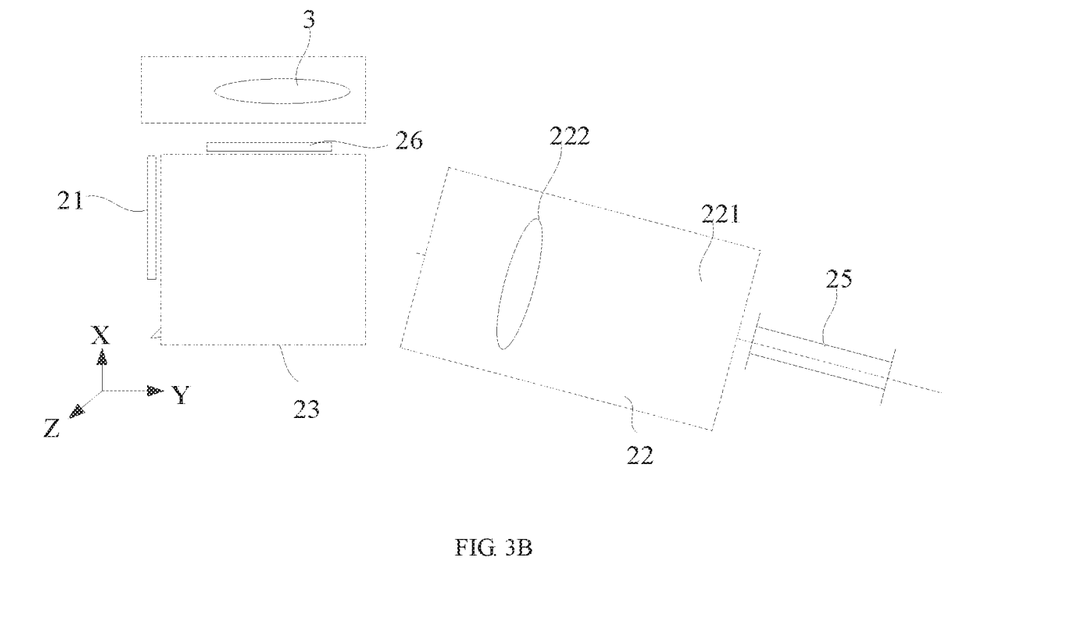
FIG. 3B is a schematic diagram illustrating a structure of an optical illumination system according to some examples of the present disclosure.

In some examples, as shown in FIG. 3B, the optical illumination system further includes a flat plate vibrating element 26. The flat plate vibrating element 26 is disposed at an outer side of the third side surface of the wedge prism 232. The light beam from the wedge prism 232 is directed to the flat plate vibrating element 26. After being emitted by the flat plate vibrating element 26, the light beam is incident to the imaging system 3.

Figure 4A:
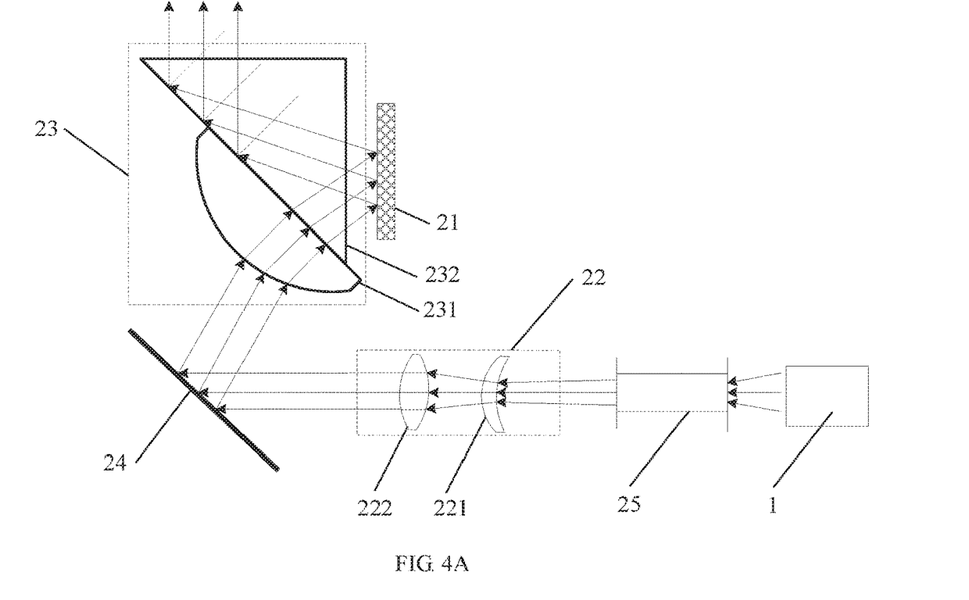
FIG. 4A is a schematic diagram illustrating a structure of another optical illumination system according to some examples of the present disclosure.
Figure 4B:
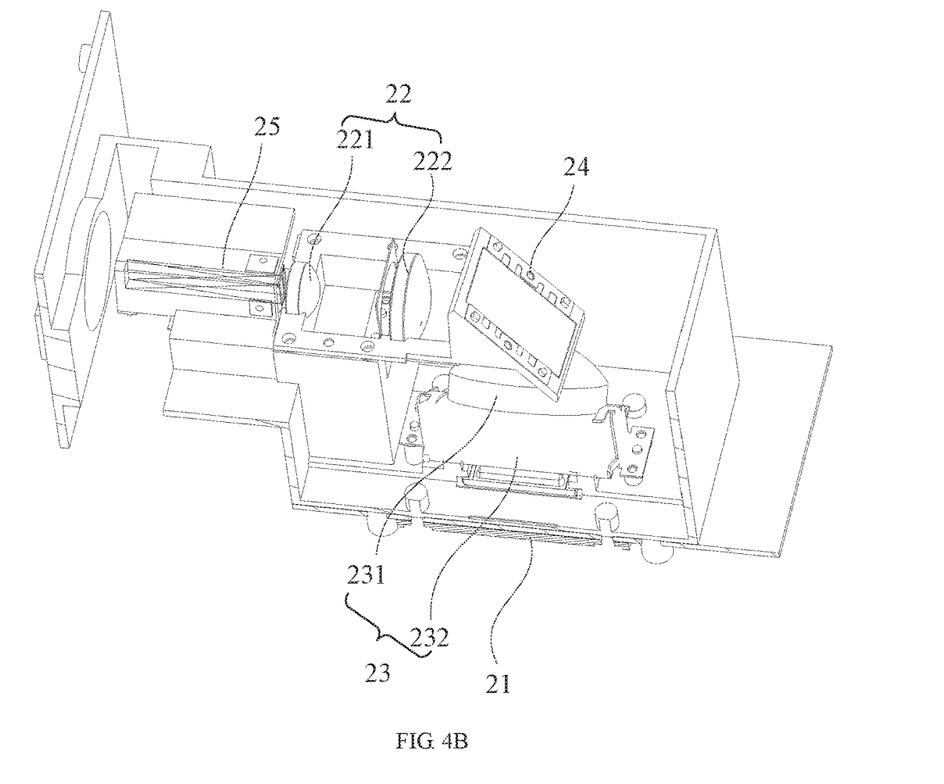
FIG. 4B illustrates a structure of the optical illumination system of FIG. 4A according to some examples of the present disclosure.

In another implementation, as shown in FIGS. 4A-4B, the optical illumination system 2 further includes a plane reflector 24. The convex surface of the first plano-convex lens 231 faces away from the lens assembly 22. The plane reflector 24 is configured to reflect the light beam from the lens assembly 22 to the convex surface of the first plano-convex lens 231. In this way, under the action of the plane reflector 24, the light beam emitted by the lens assembly 22 is reflected to the convex surface of the first plano-convex lens 231. Thus, the first plano-convex lens 231 refracts the light beam.

In some examples, when a space in the projection device is small, for example, the space cannot accommodate the lens assembly 22 and the RTIR assembly 23 at the same time in a length direction, the positions of the lens assembly 22 and the RTIR assembly 23 are adjusted. Further, under the action of the plane reflector 24, the light beam from the lens assembly 22 is adjusted to the convex surface of the first plano-convex lens 231. Thus, the first plano-convex lens 231 refracts the light beam.

Figure 5:
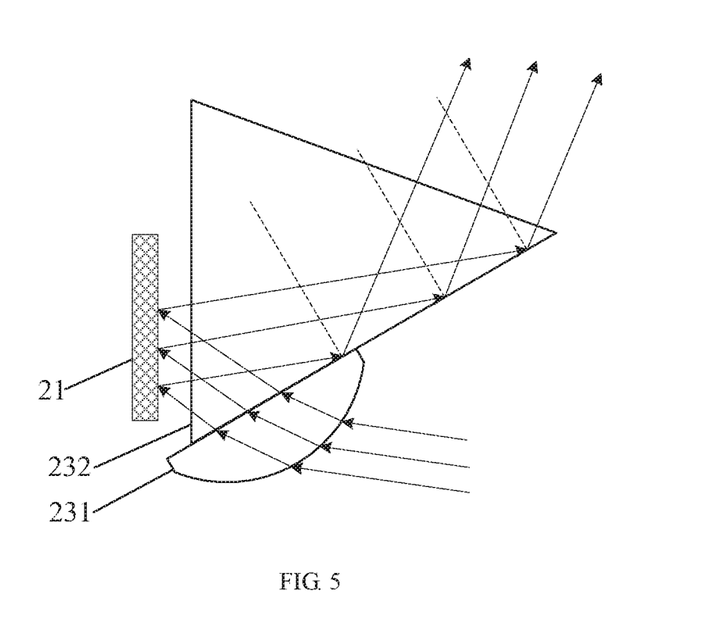
FIG. 5 is a schematic diagram illustrating a light beam propagation path of a RTIR assembly according to some examples of the present disclosure.
Figure 6:
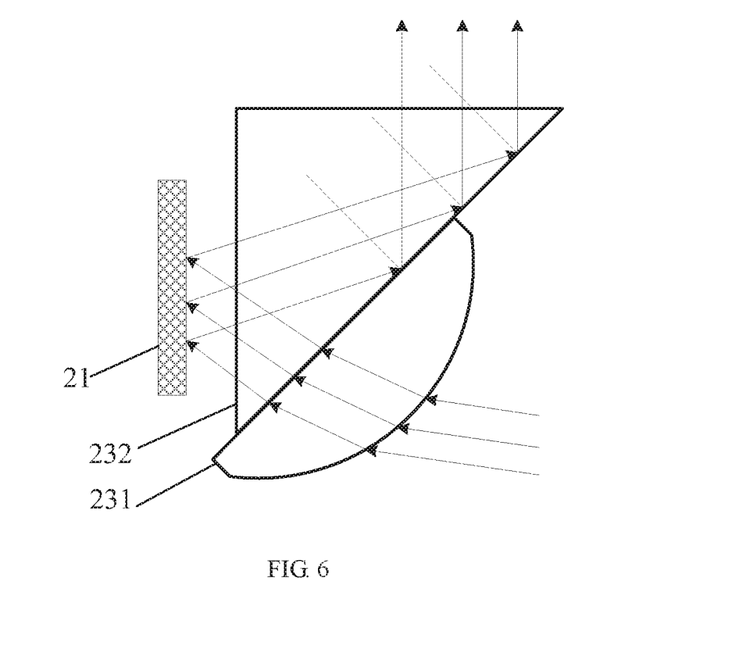
FIG. 6 is a schematic diagram illustrating a light beam propagation path of another RTIR assembly according to some examples of the present disclosure.
Figure 7:
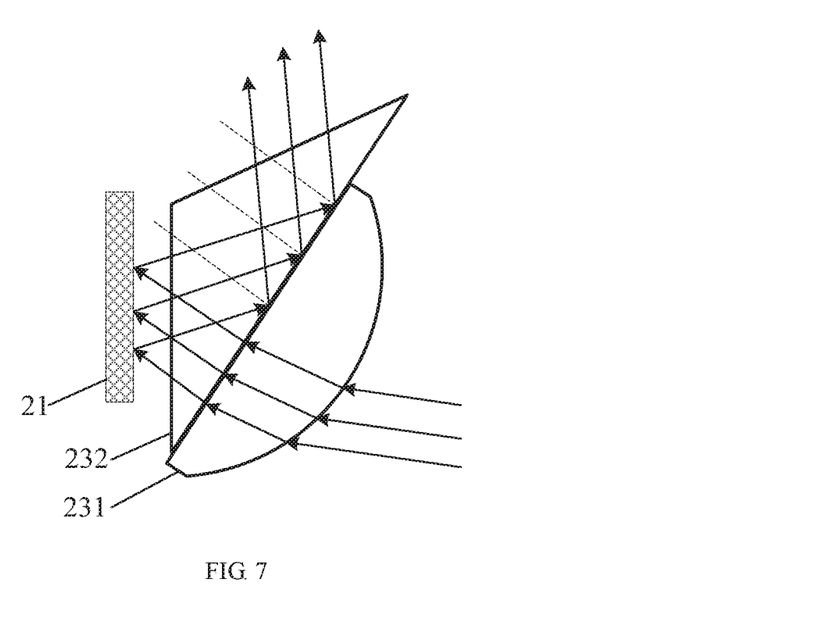
FIG. 7 is a schematic diagram illustrating a light beam propagation path of another RTIR assembly according to some examples of the present disclosure.

In some examples, the wedge prism 232 is of a triangular prism structure, for example, the wedge prism 232 is a prism of acute isosceles triangular prism, right-angled isosceles triangular prism or obtuse isosceles triangular prism or the like. Correspondingly, propagation paths of the light beam from the lens assembly 22 in the plano-convex lens, the wedge prism 232 and the DMD 21 are shown in FIGS. 5, 6, and 7.

In another examples, the wedge prism 232 is of a four-angle structure or a five-angle structure or the like, which is not limited as long as the light beam emitted by the lens assembly 22 sequentially goes through refraction by the wedge prism 232, the reflection by the DMD 21, and the total internal reflection by the wedge prism 232 after being refracted by the plano-convex lens.

In some examples, after the refraction of the wedge prism 232, the reflection of the DMD 21 and the total internal reflection of the wedge prism 232 are achieved sequentially based on the shape of the wedge prism 232, a region of the wedge prism 232 that the light beam does not travel through is cut off to reduce the size of the wedge prism 232. Thus, the size of the optical illumination system is further reduced.

In an implementation, in FIG. 3A or 4A, the lens assembly 22 includes a third concave-convex lens 221 and a fourth double-convex lens 222. A centerline of the third concave-convex lens 221 overlaps with a centerline of the fourth double-convex lens 222. A concave surface of the third concave-convex lens 221 faces the light source system 1, and the third concave-convex lens 221 is between the fourth double-convex lens 222 and the light source system 1. The third concave-convex lens 221 is configured to diverge the light beam emitted by the light source system 1 and direct the diverged light beam to the fourth double-convex lens 222. The fourth double-convex lens is configured to converge the light beam diverged by the third concave-convex lens 221 and direct the converged light beam to the convex surface of the plano-convex lens.

A light spot formed by the light beam emitted by the light source system 1 is possibly small. The light beam reflected by the DMD 21 forms a light spot on the plane where the DMD 21 is located. To ensure that the formed light spot covers or matches the DMD 21, the light beam emitted by the light source system 1 is diverged by the third concave-convex lens 221. The third concave-convex lens 221 is a positive lens or a negative lens, which is not limited herein as long as the light beam emitted by the light source system 1 is diverged. The light beam diverged by the third concave-convex lens 221 is converged by the fourth double-convex lens 222. In this way, it is avoided that a divergence angle of the light beam diverged by the third concave-convex lens 221 is large. Such large divergence angle causes partial light beams not to be emitted to the plano-convex lens, resulting in waste of light energy.

Further, as shown in FIG. 3A or 4A, the optical illumination system 2 further includes a rectangular light pipe 25. A centerline of the rectangular light pipe 25 overlaps with a centerline of the third concave-convex lens 221, and the rectangular light pipe is between the light source system 1 and the third concave-convex lens 221. The rectangular light pipe 25 is configured to shape the light beam emitted by the light source system 1 and direct the shaped light beam to the concave surface of the third concave-convex lens 221. The size of the rectangular light pipe 25 is in a preset proportion to the size of the DMD 21.

In some examples, the rectangular light pipe 25 shapes the light beam emitted by the light source system 1 into light beam of a rectangular shape in a preset proportion to the DMD 21. Afterwards, the shaped light beam is diverged or converged by the lens assembly 22. In this way, it is ensured that a light spot formed by the diverged and/or converged light beam covers or matches the DMD 21, thereby reducing the waste of light energy. A length of the rectangular light pipe 25 is in a preset proportion to a length of the DMD 21, and a width of the rectangular light pipe 25 is in a preset proportion to a width of the DMD 21. The preset proportion is designed according to the size of the optical illumination system 2.

Figure 8:
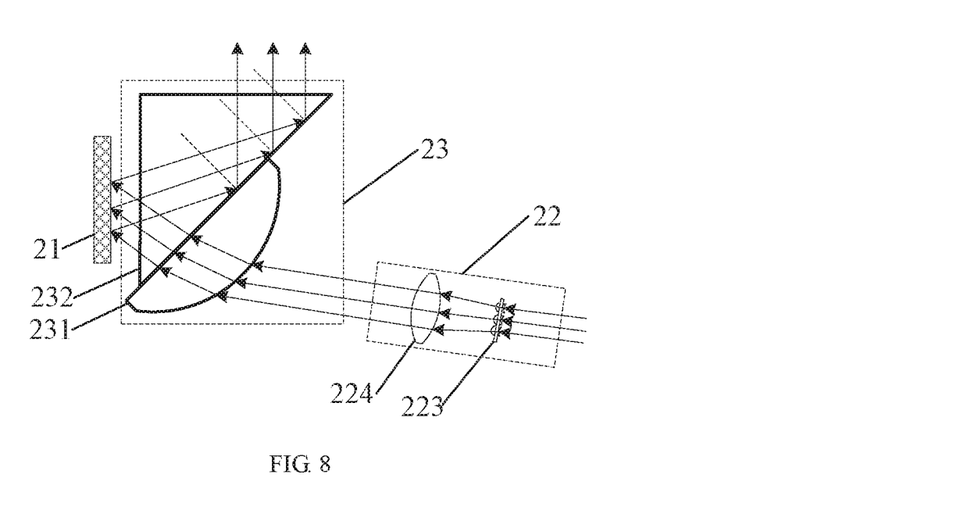
FIG. 8 is a schematic diagram illustrating a structure of another optical illumination system according to some examples of the present disclosure.

In another implementation, as shown in FIG. 8, the lens assembly 22 includes a fly-eye lens 223 and a fifth double-convex lens 224. A centerline of the fly-eye lens 223 overlaps with a centerline of the fifth double-convex lens 224. The fly-eye lens 223 is between the fifth double-convex lens 224 and the light source system 1. The fly-eye lens 223 is configured to homogenize and diverge the light beam emitted by the light source system 1 and direct the homogenized and diverged light beam to the fifth double-convex lens 224. The fifth double-convex lens 224 is configured to converge the light beam homogenized and diverged by the fly-eye lens 223 and direct the converged light beam to the convex surface of the plano-convex lens.

In some examples, the fly-eye lens 223 is obtained by disposing a plurality of concave-convex lens units in an array. A concave surface of each concave-convex lens unit of the fly-eye lens 223 faces the light source system 1. Alternatively, the fly-eye lens 223 may further be obtained by disposing other lens units in an array, which is not limited herein as long as the fly-eye lens 223 diverges the light beam emitted by the light source system 1.

The lens assembly 22 may also be disposed in another combination, which is not limited herein as long as divergence and convergence of light beam are achieved. For example, the lens assembly 22 includes a double-concave lens and a double-convex lens. The double-concave lens diverges the light beam emitted by the light source system 1 and directs the diverged light beam to the double-convex lens. The double-convex lens converges the light beam diverged by the double-concave lens and directs the converged light beam to the first plano-convex lens.

In some examples, different lenses and plano-convex lenses included in the lens assembly 22, different reflectors or different lenses included in a laser light focusing assembly 12 and different lenses included in a light beam shaping assembly 14 may be spherical or non-spherical, which is not limited herein. When the projection device has low requirements for the light source system 1 and the optical illumination system 2, spherical elements are selected. When the projection device has high requirements for the light source system 1 and the optical illumination system 2, non-spherical elements are selected. In this way, projection effect of the projection device is improved.

Figure 9:
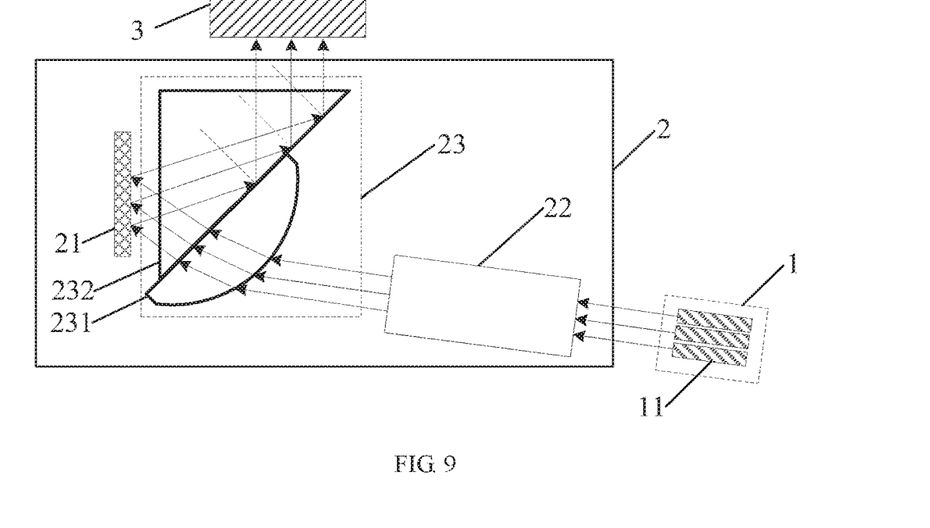
FIG. 9 is a schematic diagram illustrating a structure of a projection device according to some examples of the present disclosure.

In some examples of the present disclosure, as shown in FIG. 9, the projection device includes a light source system 1. The light source system 1 includes at least three laser assemblies of different colors. The at least three laser assemblies 11 are configured to output at least three groups of light beams of different colors, that is, each laser assembly outputs one group of homochromatic light beams. The at least three laser assemblies output at least three corresponding groups of homochromatic light beams respectively. The at least three groups of light beams have at least three corresponding different colors. The at least three laser assemblies 11 emit the at least three groups of output light beams to the lens assembly 22. The lens assembly 22 is configured to adjust the light beams emitted by the at least three laser assemblies 11 and direct the adjusted light beams to the convex surface of the first plano-convex lens 231. Then, the illumination of the projection device is achieved under the joint action of the first plano-convex lens 231, the wedge prism 232 and the DMD 21.

In some examples of the present disclosure, since the light source system 1 directly adopts at least three laser assemblies 11 of different colors, a fluorescence wheel which performs fluorescence reflection for the light beam from the laser assemblies 11 is avoided. Thus, the number of devices in the light source system 1 and the size of the light source system 1 are reduced.

The laser assembly emitting light of each color may include a single monochromatic laser, or a laser array arranged with a plurality of monochromatic lasers. For example, a laser assembly emitting blue light may include a single blue light laser. For another example, the laser assembly emitting blue light may include a laser array arranged with a plurality of blue light lasers. By properly increasing the number of lasers in the laser array, the power of the light beam emitted by the light source system 1 is improved and the projection effect of the projection device is further improved. The at least three laser assemblies emitting light of different colors include a laser assembly 11 emitting blue light, a laser assembly 11 emitting green light and a laser assembly 11 emitting red light. In some implementations a practical application, the at least three laser assemblies 11 may further include a laser assembly emitting yellow light or a laser assembly emitting light of another color. A plane formed by arranging the at least three laser assemblies 11 is perpendicular to the centreline of the lens assembly 22, and an angle formed by the primary optical axis of a light beam emitted by each laser assembly 11 and the centreline of the lens assembly 22 is smaller than a given angle. In this way, it is ensured that most light beams emitted by the at least three laser assemblies 11 are directed to and will pass through the lens assembly 22. The primary optical axis refers to a ray in a light beam in a centreline direction of the light beam.

Figure 10:
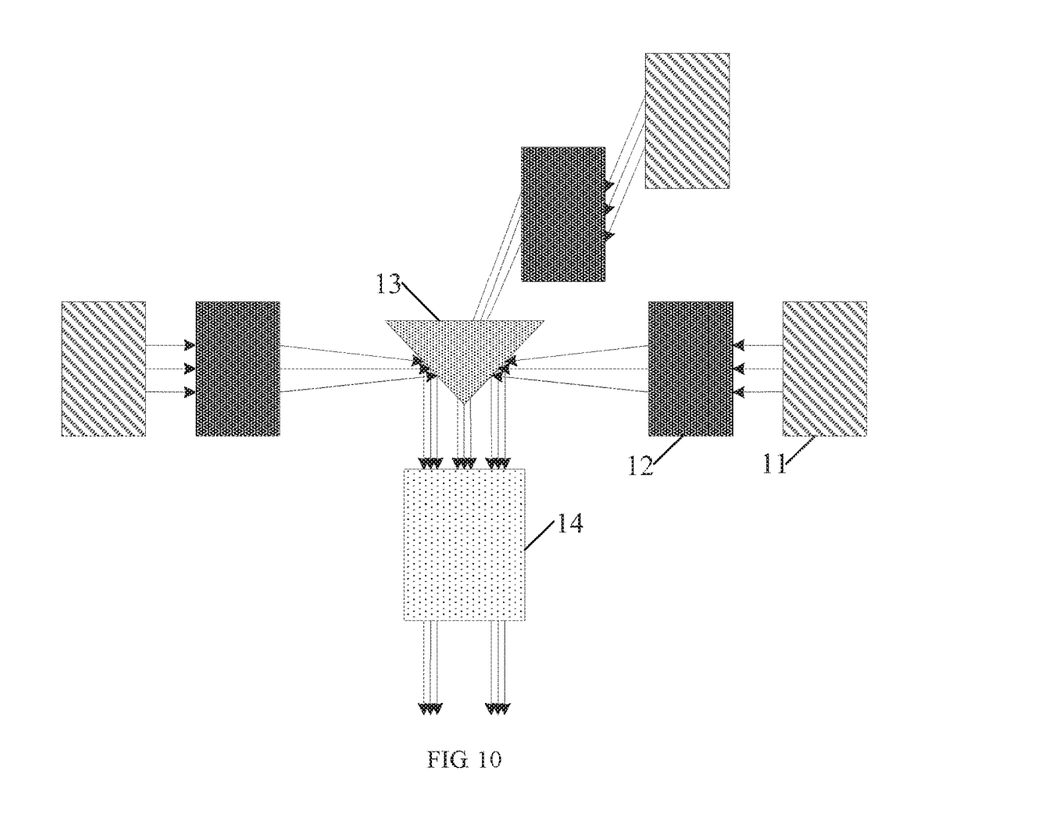
FIG. 10 is a schematic diagram illustrating a structure of a light source system according to some examples of the present disclosure.

In some examples of the present disclosure, as shown in FIG. 10, the light source system 1 further includes at least three laser light focusing assemblies 12 in one-to-one correspondence with the at least three laser assemblies 11, a conic reflecting body 13 and a light beam shaping assembly 14. Each laser light focusing assembly 12 is at a light emitting side of a corresponding laser assembly 11. The conic reflecting body 13 is at an intersection point of light beams emitted by at least three laser light focusing assemblies 12. A laser light reflection region is on a side surface of the conic reflecting body 13 and a vertex of the conic reflecting body 13 faces the light beam shaping assembly 14. A centerline of the light beam shaping assembly 14 is perpendicular to a plane where the at least three laser assemblies 11 are located. The lens assembly 22 is at a light emitting side of the light beam shaping assembly 14. Each laser light focusing assembly 12 is configured to focus the light beam emitted by the corresponding laser assembly 11 and emit the focused light beam to the laser light reflection region of the conic reflecting body 13. The conic reflecting body 13 is configured to reflect the light beam focused by each laser light focusing assembly 12. The light beam shaping assembly 14 is configured to shape the light beam reflected by the conic reflecting body 13 and emit the shaped light beam to the lens assembly 22.

The conic reflecting body 13 rotates at a rotation speed to generate a light beam of different color after reflection of the laser light reflection region of the conic reflecting body 13. Alternatively, the conic reflecting body 13 may further be fixed, and, rotation may instead be performed for the at least three laser assemblies 11 and at least three corresponding laser light focusing assemblies 12. The conic reflecting body 13 may be a regular triangular cone, a regular four-angle cone or the like. The number of the side edges or side surfaces of the conic reflecting body 13 is consistent with the number of colors of the laser assembly 11. A laser light reflection region is on a side surface that is on the conic reflecting body 13 and opposite to the light emitting side of the at least three laser assemblies 11. The laser light reflection region is coated with fluorescence powder. When each laser light focusing assembly 12 emits the focused light beam to the laser light reflection region, the laser light reflection region reflects the light beam emitted by each laser light focusing assembly 12 and emits the reflected light beam to the light beam shaping assembly 14.

In some examples, the centerline of each laser light focusing assembly 12 overlaps with the primary optical axis of the light beam emitted by the corresponding laser assembly 11, so that the focusing effect of the light beam is improved. The at least three laser assemblies 11 and the at least three laser light focusing assembly 12 are disposed around the conic reflecting body 13 with the disposal position of the conic reflecting body 13 as a center. Further, distances between different laser assemblies 11 and the conic reflecting body 13 may be identical, and distances between different laser light focusing assemblies 12 and the conic reflecting body 13 may also be identical. In this case, one group of light beams emitted by each laser assembly 11 is directed to the conic reflecting body 13 after being focused by the corresponding laser light focusing assembly 12. At least three laser assemblies 11 are uniformly disposed along a circumferential direction, that is, at least three groups of light beams emitted respectively by at least three laser assemblies 11 are incident to all side surfaces of the conic reflecting body 13. Alternatively, the at least three laser assemblies may also be distributed randomly along the circumferential direction. For example, at least three groups of light beams emitted respectively by the at least three laser assemblies 11 are incident to at least one side surface of the conic reflecting body 13.

Figure 11:
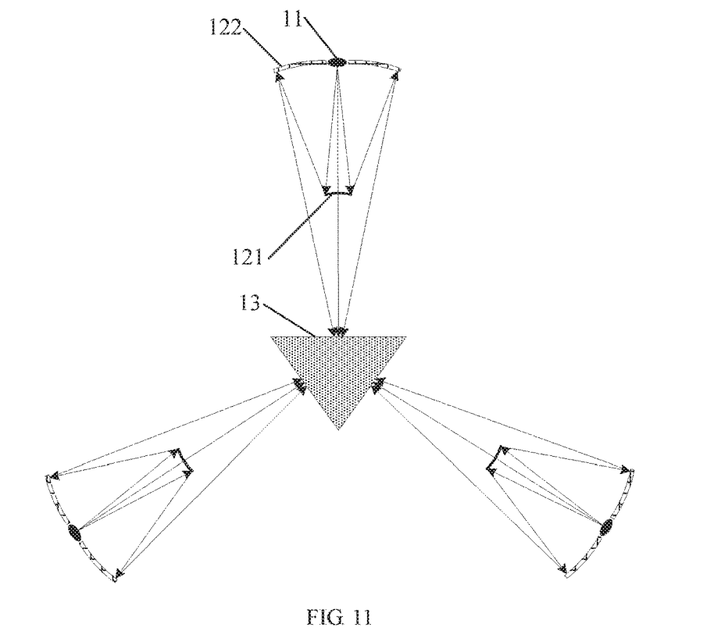
FIG. 11 is a schematic diagram illustrating a structure of another light source system according to some examples of the present disclosure.

In an implementation, as shown in FIG. 11, each laser light focusing assembly 12 includes a convex reflector 121 and at least one concave reflector 122. The convex reflector 121 is at a light emitting side of the corresponding laser assembly 11, and a convex surface of the convex reflector 121 faces the corresponding laser assembly 11. At least one concave reflector 122 is at a side of the corresponding laser assembly 11, and a concave surface of each concave reflector 122 faces the convex surface of the convex reflector 121. The convex reflector 121 is configured to diverge the light beam emitted by the corresponding laser assembly 11 and emit the diverged light beam to at least one concave reflector 122. At least one concave reflector 122 is configured to converge the light beam diverged by the convex reflector 121 and reflect the converged light beam to the conic reflecting body 13.

In some examples, the convex reflector 121 is between the corresponding laser assembly 11 and the conic reflecting body 13, alternatively, the convex reflector may also be at a side that is on the conic reflector 13 and away from the corresponding laser assembly 11, which is not limited herein as long as the light beam emitted by the corresponding laser assembly 11 is diverged. At least one concave reflector 122 is distributed on a plane perpendicular to the primary optical axis of the light beam emitted by the corresponding laser assembly 11 and at least one concave reflector 122 are uniformly distributed along a circumferential direction. In this way, most light beams diverged by the convex reflector 121 are more conveniently converged by at least one concave reflector 122. Thus, the focusing effect of the laser light focusing assembly 12 is improved while the waste of light energy is reduced.

As shown in FIG. 11, the light source system 1 includes three monochromatic lasers 11 that emit light of different colors and are uniformly distributed along the circumferential direction. The three monochromatic lasers are a blue light monochromatic laser, a green light monochromatic laser, and a red light monochromatic laser. The conic reflecting body 13 is a regular three-angle cone. The light beam emitted by each monochromatic laser 11 is directed to a corresponding convex reflector 121, and then reflected by the convex reflector 121 to at least one corresponding concave reflector 122, and then reflected by the at least one concave reflector 122 to one side surface of the conic reflecting body 13. In this way, the light beam emitted by the corresponding monochromatic laser 11 is focused.

In some examples, when the laser assembly 11 is a single monochromatic laser, the light beam emitted is narrow. When the laser assembly 11 is a monochromatic laser array, the light beam emitted is broad. To avoid large sizes of the convex reflector 121 and the at least one concave reflector 122 corresponding to the laser assembly 11, each laser assembly 11 may include a single monochromatic laser.

Figure 12:
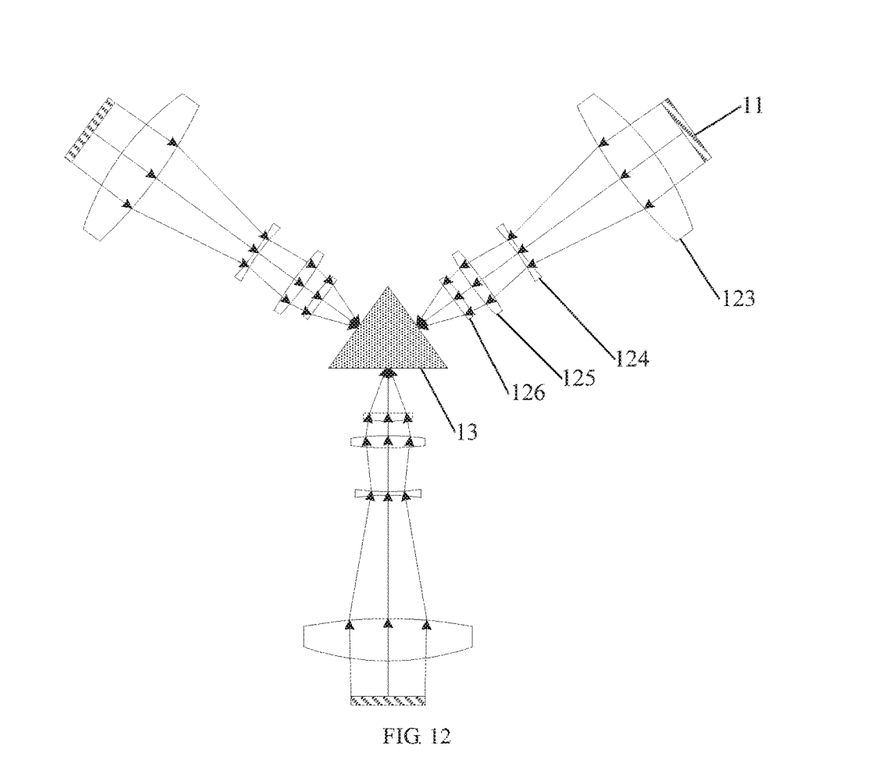
FIG. 12 is a schematic diagram illustrating a structure of another light source system according to some examples of the present disclosure.

In another implementation, as shown in FIG. 12, each laser light focusing assembly 12 includes a first double-convex lens 123, a first double-concave lens 124, a second double-convex lens 125, and a second plano-convex lens 126. The first double-convex lens 123, the first double-concave lens 124, the second double-convex lens 125 and the second plano-convex lens 126 are sequentially disposed at a light emitting side of a corresponding laser assembly 11. A centerline of the first double-convex lens 123, a centerline of the first double-concave lens 124, and a centerline of the second double-convex lens 125 and a centerline of the second plano-convex lens 126 overlap with the primary optical axis of the light beam emitted by the corresponding laser assembly 11. The second plano-convex lens 126 may be closer to the conic reflecting body 13 than the first double-convex lens 123. The plane surface of the second plano-convex lens 126 faces the conic reflecting body 13. The first double-convex lens 123 is configured to converge the light beam emitted by the corresponding laser assembly 11 and transmit the converged light beam to the first double-concave lens 124. The first double-concave lens 124 is configured to diverge the light beam converged by the first double-convex lens 123 and transmit the diverged light beam to the second double-convex lens 125. The second double-convex lens 125 and the second plano-convex lens 126 are sequentially configured to converge the light beam diverged by the first double-concave lens 124 and transmit the converged light beam to the conic reflecting body 13.

In some examples, the first double-concave lens 124 and the second double-convex lens 125 are disposed separately, that is, there is a distance between the two lenses. Alternatively, the first double-concave lens 124 and the second double-convex lens 125 may also be a combined glued lens, that is, the first double-concave lens 124 and the second double-convex lens 125 are glued in advance.

As shown in FIG. 12, the light source system 1 includes three monochromatic laser arrays that emit light of different colors and are uniformly distributed along a circumferential direction. The three monochromatic laser arrays may include a blue light monochromatic laser array, a green light monochromatic laser array and a red light monochromatic laser array. The conic reflecting body 13 includes a regular triangular cone. The light beam from each monochromatic laser array 11 is emitted to a corresponding first double-convex lens 123 for convergence. The first double-convex lens 123 transmits the converged light beam to a corresponding first double-concave lens 124. The first double-concave lens 124 diverges the converged light beam and transmits the diverged light beam to a corresponding second double-convex lens 125. The corresponding second double-convex lens 125 and the corresponding second plano-convex lens 126 are sequentially configured to converge the light beam diverged by the first double-concave lens 124 and transmit the converged light beam to one side surface of the conic reflecting body 13. In this way, the light beam output by the corresponding monochromatic laser array 11 is focused.

In some examples, the centerline of the light beam shaping assembly 14 overlaps with the centerline of the conic reflecting body 13, to improve the shaping effect of the light beam shaping assembly 14 and reduce waste of light energy. An angle formed by the centerline of the light beam shaping assembly 14 and the centerline of each laser light focusing assembly 12 ranges of 0-180 degrees. The specific value of the angle is determined according to the conic reflecting body 13. The light beam shaping assembly 14 shapes the light beams of different colors reflected by the conic reflecting body 13 according to the requirements of the optical illumination system 2 for light beams, such as light spot size, and uniformity and so on, and then emits the shaped light beam to the lens assembly 22 included in the optical illumination system 2.

Figure 13:
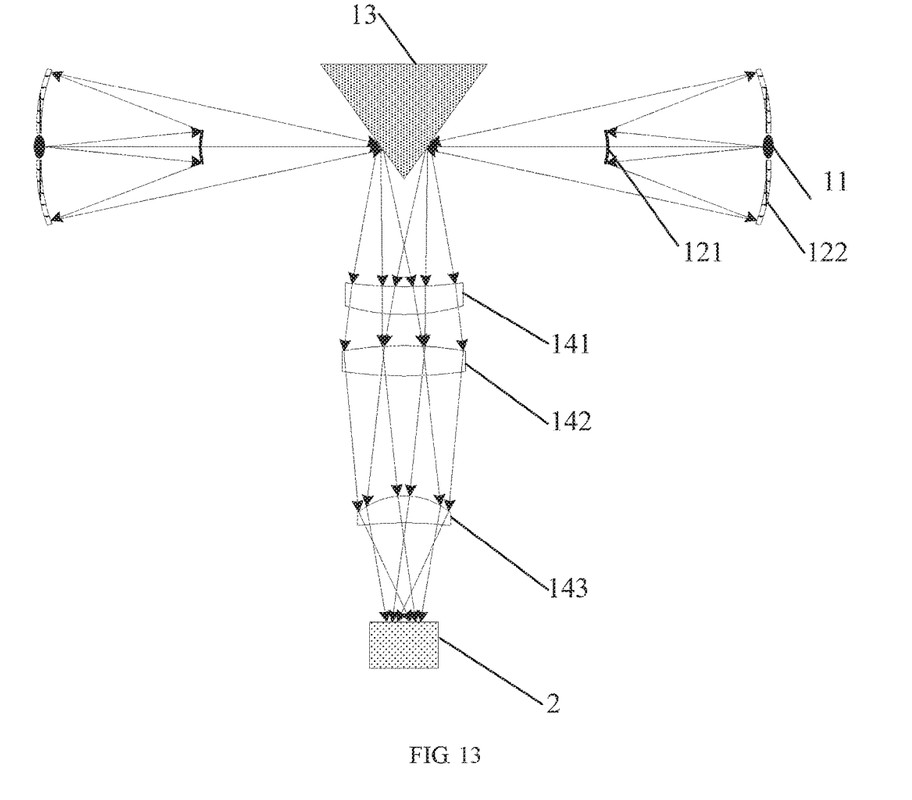
FIG. 13 is a schematic diagram illustrating a structure of another light source system according to some examples of the present disclosure.

In an implementation, as shown in FIG. 13, the light beam shaping assembly 14 includes a first concave-convex lens 141, a third double-convex lens 142, and a second concave-convex lens 143. The first concave-convex lens 141, the third double-convex lens 142 and the second concave-convex lens 143 are sequentially at a light emitting side of the conic reflecting body 13. A centerline of the first concave-convex lens 141, a centerline of the third double-convex lens 142, and a centerline of the second concave-convex lens 143 overlap with the primary optical axis of the light beam reflected by the conic reflecting body 13. The first concave-convex lens 141 is closer to the conic reflecting body 13 than the second concave-convex lens 143, a concave surface of the first concave-convex lens 141 faces the conic reflecting body 13, and a convex surface of the second concave-convex lens 143 faces the third double-convex lens 142. The first concave-convex lens 141 is configured to diverge the light beam reflected by the conic reflecting body 13 and transmit the diverged light beam to the third double-convex lens 142. The third double-convex lens 142 and the second concave-convex lens 143 are sequentially configured to converge the light beam diverged by the first concave-convex lens 141 and transmit the converged light beam to the optical illumination system 2.

In some examples, the light beam shaping assembly 14 includes optical devices for meeting other shaping requirements, in addition to the first concave-convex lens 141, the third double-convex lens 142 and the second concave-convex lens 143. For example, an optical device is disposed between the third double-convex lens 142 and the second concave-convex lens 143, which is not limited herein.

Figure 14:
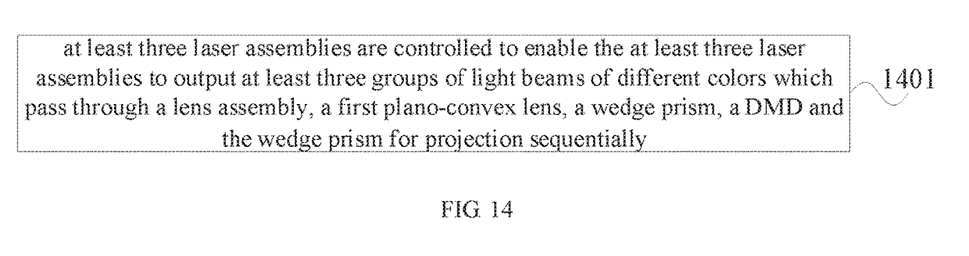
FIG. 14 is a flowchart illustrating a method of controlling a projection device according to some examples of the present disclosure.

FIG. 14 is a flowchart illustrating a method of controlling a projection device according to some examples of the present disclosure. The method may be applied to the projection device described in the above examples. As shown in FIG. 14, the method includes the following block 1401.

At block 1401, at least three laser assemblies are controlled to enable the at least three laser assemblies to output at least three groups of light beams of different colors which pass through a lens assembly, a first plano-convex lens, a wedge prism, a DMD and the wedge prism for projection sequentially.

Specifically, at least three laser assemblies emitting light of different colors are controlled to be turned on. Each of the at least three laser assemblies outputs one group of light beams, that is, at least three laser assemblies output at least three groups of light beams and emit the light beams to the lens assembly. The at least three groups of light beams include at least one group of blue light beams, at least one group of green light beams and at least one group of red light beams. The lens assembly adjusts the at least three groups of light beams and transmits the adjusted light beams to the convex surface of the first plano-convex lens. The first plano-convex lens refracts the light beams adjusted by the lens assembly and directs the refracted light beams to the first side surface of the wedge prism. The wedge prism re-refracts the light beams refracted by the first plano-convex lens and directs the re-refracted light beams to the DMD from the first light emitting side of the wedge prism. The DMD reflects the light beams re-refracted by the wedge prism, and directs the reflected light beams to the first side surface of the wedge prism through the second side surface of the wedge prism. The first side surface of the wedge prism performs total internal reflection for the light beams reflected by the DMD and directs the light beams subjected to total internal reflection to the imaging system from the second light emitting side of the wedge prism. Thus, the projection of the projection device is realized.

Each laser assembly emits light of a different color, that is, each laser assembly is a monochromatic laser assembly. In this case, each laser assembly outputs one group of monochromatic light beam. Due to high monochromaticity and high color purity of each light beam, no filter wheel is disposed at the light emitting side of the laser assembly. At least three laser assemblies of different colors are taken as a light source. In this way, use of fluorescence wheel which performs the fluorescence reflection for the light beam from the laser assemblies is avoided. Thus, the number of devices in the light source system and the size of the light source system are reduced.

Since illumination of the projection device is achieved under the joint action of the lens assembly, the first plano-convex lens, the wedge prism and the DMD, the number of the wedge prisms in the optical illumination system and the size of the optical illumination system are reduced, thereby realizing miniaturization of the projection device.

Those skilled in the art may understand that all or part of the blocks of the above examples can be completed with hardware or completed by instructing relevant hardware by programs. The programs may be stored in a computer readable storage medium. The above storage medium may be a read-only memory, magnetic disk or compact disk or the like.

The above descriptions are merely some examples of the present disclosure and will not be intended to limit the present disclosure. Any modification, equivalent substitutions and improvements and so on made within the spirit and principle of the present disclosure shall all fall within the scope of protection of the present disclosure.

The invention claimed is:
1. An optical illumination system, comprising:
a lens assembly, configured to adjust a light beam;
a refraction total internal reflection (RTIR) assembly, comprising
a first plano-convex lens comprising a plane surface and a convex surface, and configured to refract the light beam adjusted by the lens assembly; and
a wedge prism comprising a first side surface, a second side surface and a third side surface, wherein the first side surface of the wedge prism is glued with the plane surface of the first plano-convex lens, and the wedge prism is configured to receive and refract the light beam refracted by the first plano-convex lens through the first side surface, and the light beam refracted by the first side surface is transmitted through the second side surface; and
a digital micro-mirror device (DMD), located at a light emitting side of the second side surface of the wedge prism, and configured to receive and reflect the light beam from the second side surface of the wedge prism, wherein the reflected light beam is incident to the first side surface of the wedge prism through the second side surface of the wedge prism for total internal reflection then transmitted through the third side surface,
wherein:
the light beam refracted by the first plano-convex lens forms a first light spot in a plane where the first side surface of the wedge prism is located, and the first light spot is within the first side surface of the wedge prism;
the light beam refracted by the wedge prism forms a second light spot in a plane where the second side surface of the wedge prism is located, and the second light spot is within the second side surface of the wedge prism;
the light beam reflected by the DMD forms a third light spot in a plane where the first side surface of the wedge prism is located, and the third light spot is within the first side surface of the wedge prism; and
the light beam subjected to total internal reflection of the wedge prism forms a fourth light spot in a plane where the third side surface of the wedge prism is located, and the fourth light spot is within on the third side surface of the wedge prism; and
wherein the lens assembly comprises a fly-eye lens and a second double-convex lens;
a centerline of the fly-eye lens overlaps with a centerline of the second double-convex lens, the fly-eye lens is between the second double-convex lens and a light source system, the fly-eye lens is configured to homogenize and diverge the light beam emitted by the light source system and transmit the homogenized and diverged light beam to the second double-convex lens; and
the second double-convex lens is configured to converge the light beam homogenized and diverged by the fly-eye lens and transmit the converged light beam to the convex surface of the first plano-convex lens.

2. The optical illumination system according to claim 1, wherein a preset angle is formed between a centerline of the first plano-convex lens and a centerline of the lens assembly.

3. The optical illumination system according to claim 1, wherein a gap exists between the first side surface of the wedge prism and the plane surface of the first plano-convex lens.

4. The optical illumination system according to claim 1, wherein the light beam that is received by the DMD and from the second side surface of the wedge prism forms a light spot on a plane where the DMD is located, and the light spot matches the DMD.

5. The optical illumination system according to claim 1, wherein the first plano-convex lens is at a light emitting side of the lens assembly, and a convex surface of the first plano-convex lens faces the lens assembly.

6. The optical illumination system according to claim 1, further comprising:
a plane reflector, wherein the convex surface of the first plano-convex lens faces toward the lens assembly, and the plane reflector is configured to reflect the light beam emitted by the lens assembly to the convex surface of the first plano-convex lens.

7. The optical illumination system according to claim 1, wherein the wedge prism is of a triangular prism structure, and the triangular prism structure comprises at least one of an acute isosceles triangular prism, a right-angled isosceles triangular prism or an obtuse isosceles triangular prism.

8. The optical illumination system according to claim 1, wherein the lens assembly comprises a concave-convex lens and a first double-convex lens;
a centerline of the concave-convex lens overlaps with a centerline of the first double-convex lens, a concave surface of the concave-convex lens faces a light source system, and the concave-convex lens is between the first double-convex lens and the light source system; and
the concave-convex lens is configured to diverge the light beam emitted by the light source system and transmit the diverged light beam to the first double-convex lens, and the first double-convex lens is configured to converge the light beam diverged by the concave-convex lens and transmit the converged light beam to the convex surface of the first plano-convex lens.

9. The optical illumination system according to claim 8, further comprising a rectangular light pipe, wherein,
a centerline of the rectangular light pipe overlaps with a centerline of the concave-convex lens, the rectangular light pipe is between the light source system and the concave-convex lens, the rectangular light pipe is configured to shape the light beam emitted by the light source system and emit the shaped light beam to a concave surface of the concave-convex lens, and a size of the rectangular light pipe is in a preset proportion to a size of the DMD.

10. A projection device, comprising:
a light source system, comprising at least three laser assemblies, wherein the at least three laser assemblies are configured to output at least three groups of light beams of different colors; and
the optical illumination system according to claim 1, wherein,
the lens assembly of the optical illumination system is at a light emitting side of the at least three laser assemblies, and the lens assembly is configured to adjust light beams emitted by the at least three laser assemblies and emit the adjusted light beams to the first plano-convex lens, wherein:
the light source system further comprises at least three laser light focusing assemblies in one-to-one correspondence with the at least three laser assemblies, a conic reflecting body and a light beam shaping assembly;
each laser light focusing assembly is at a light emitting side of a corresponding laser assembly, the conic reflecting body is at an intersection point of primary optical axes of light beams emitted by the at least three laser light focusing assemblies, a laser light reflection region is on a side surface of the conic reflecting body, a vertex of the conic reflecting body faces the light beam shaping assembly, a centerline of the light beam shaping assembly is perpendicular to a plane where the at least three laser assemblies are located, and the lens assembly is at a light emitting side of the light beam shaping assembly; and
each laser light focusing assembly is configured to focus the light beam emitted by a corresponding laser assembly and emit the focused light beam to the laser light reflection region of the conic reflecting body, the conic reflecting body is configured to reflect the light beam focused by each laser light focusing assembly, and the light beam shaping assembly is configured to shape the light beam reflected by the conic reflecting body and emit the shaped light beam to the lens assembly.

11. The projection device according to claim 10, wherein each laser light focusing assembly comprises a convex reflector and at least one concave reflector;
the convex reflector is at a light emitting side of a corresponding laser assembly, and a convex surface of the convex reflector faces the corresponding laser assembly, the at least one concave reflector is at a side of a corresponding laser assembly, and a concave surface of each concave reflector faces the convex surface of the convex reflector;
the convex reflector is configured to diverge the light beam emitted by a corresponding laser assembly and emit the diverged light beam to the at least one concave reflector, and the at least one concave reflector is configured to converge the light beam diverged by the convex reflector and emit the converged light beam to the conic reflecting body.

12. The projection device according to claim 10, wherein each laser light focusing assembly comprises a first double-convex lens, a first double-concave lens, a second double-convex lens and a second plano-convex lens;
the first double-convex lens, the first double-concave lens, the second double-convex lens and the second plano-convex lens are sequentially at a light emitting side of a corresponding laser assembly; a centerline of the first double-convex lens, a centerline of the first double-concave lens, a centerline of the second double-convex lens, and a centerline of the second plano-convex lens are overlapped with the primary optical axis of the light beam emitted by the corresponding laser assembly; the second plano-convex lens is closer to the conic reflecting body than the first double-convex lens, and the plane surface of the second plano-convex lens faces the conic reflecting body;
the first double-convex lens is configured to converge the light beam emitted by the corresponding laser assembly and emit the converged light beam to the first double-concave lens, the first double-concave lens is configured to diverge the light beam converged by the first double-convex lens and emit the diverged light beam to the second double-convex lens, the second double-convex lens and the second plano-convex lens are sequentially configured to converge the light beam diverged by the first double-concave lens and emit the converged light beam to the conic reflecting body.

13. The projection device according to claim 10, wherein the light beam shaping assembly comprises a first concave-convex lens, a third double-convex lens and a second concave-convex lens;

the first concave-convex lens, the third double-convex lens, and the second concave-convex lens are sequentially at a light emitting side of the conic reflecting body; a centerline of the first concave-convex lens, a centerline of the third double-convex lens, and a centerline of the second concave-convex lens overlaps with the primary optical axis of the light beam reflected by the conic reflecting body, the first concave-convex lens is closer to the conic reflecting body than the second concave-convex lens, a concave surface of the first concave-convex lens faces the conic reflecting body, and a convex surface of the second concave-convex lens faces the third double-convex lens;

the first concave-convex lens is configured to diverge the light beam reflected by the conic reflecting body and emit the diverged light beam to the third double-convex lens, the third double-convex lens and the second concave-convex lens are sequentially configured to converge the light beam diverged by the first concave-convex lens and emit the converged light beam to the lens assembly.

14. The projection device according to claim 10, wherein a centerline of the lens assembly overlaps with the primary optical axis of the light beam emitted by the light source system.

\* \* \* \* \*